United States Patent
Gosselin

(10) Patent No.: US 7,170,985 B2
(45) Date of Patent: *Jan. 30, 2007

(54) METHOD FOR ADVANCED DETERMINATION AND DISPLAY OF CALLER GEOGRAPHIC INFORMATION IN A CENTRALIZED WIRELESS ARCHITECTURE

(75) Inventor: Mark Gosselin, Seattle, WA (US)

(73) Assignee: Cequint Inc., Seattle, WA (US)

( * ) Notice: Subject to any disclaimer, the term of this patent is extended or adjusted under 35 U.S.C. 154(b) by 101 days.

This patent is subject to a terminal disclaimer.

(21) Appl. No.: 10/789,873

(22) Filed: Feb. 24, 2004

(65) Prior Publication Data

US 2004/0170139 A1     Sep. 2, 2004

Related U.S. Application Data

(63) Continuation-in-part of application No. 10/225,549, filed on Aug. 20, 2002, now Pat. No. 6,985,572.

(51) Int. Cl.
*H04M 1/56* (2006.01)
*H04M 15/06* (2006.01)
*H04M 3/42* (2006.01)

(52) U.S. Cl. .............................. 379/142.1; 379/142.17; 455/415

(58) Field of Classification Search ........... 379/142.01, 379/142.04, 142.06, 142.1, 142.17, 201.01, 379/201.04, 207.02, 207.15; 455/415
See application file for complete search history.

(56) References Cited

U.S. PATENT DOCUMENTS

| | | | | |
|---|---|---|---|---|
| 6,075,850 A * | 6/2000 | Ali et al. | ................ | 379/142.01 |
| 6,353,664 B1 * | 3/2002 | Cannon et al. | .......... | 379/142.1 |
| 6,366,670 B1 * | 4/2002 | Davis et al. | ........... | 379/387.01 |
| 6,714,639 B1 * | 3/2004 | Bedingfield et al. | ... | 379/221.13 |
| 6,813,344 B1 * | 11/2004 | Lemke | .................... | 379/142.06 |
| 2001/0011015 A1 * | 8/2001 | Shaffer et al. | .............. | 455/414 |

* cited by examiner

*Primary Examiner*—Benny Quoc Tieu
(74) *Attorney, Agent, or Firm*—Frank Frisenda

(57) ABSTRACT

An improved decoding, processing and delivery system for a centralized wireless architecture is provided for advanced determination and display of geographic information relating to a call origination party. The improved system comprises a receiving device to receive the calling number delivery (CND) message from a mobile station switching center; a central data server for storage and retrieval of specific data from a library for selectively determining the corresponding geographic information of the call origination party; a transmission device for sending data from the server; a receiving device in a wireless handset; and a readout device for displaying the geographic information of the incoming call. Accordingly, the improved system provides the user with convenient and efficient display of geographic information related to caller identification that is capable of determining an ever-increasing number of area code and local telephone exchange number.

12 Claims, 2 Drawing Sheets

METHOD FOR ADVANCED DETERMINATION AND DISPLAY OF CALLER GEOGRAPHIC INFORMATION IN A CENTRALIZED WIRELESS ARCHITECTURE

CROSS REFERENCE TO RELATED APPLICATION

This application is a continuation-in-part of my prior U.S. application Ser. No. 10/225,549, filed Aug. 20, 2002 now U.S. Pat. No. 6,985,572.

BACKGROUND OF THE INVENTION

The present invention relates generally to the science of telecommunications. In more detail, the present invention relates to a system for providing advanced geographic information to a called party about the calling party and/or call origination party.

Presently, telephone systems have evolved to include limited standard identification information about the calling phone (calling number and/or ANI) and the phone that was called (dialed number). This information is primarily obtained from the telephone number from which the phone call was placed and the telephone number that was dialed by the caller. The telephone system has recognized these two numbers as basic information sources (for routing calls and for billing purposes for example) and has developed a system of standards for the data character fields these numbers are to fill. The following background information will better explain these standards of limited phone identification used today by the telephone system of the United States and as it applies to the international standards as well.

Automatic Number Identification

Automatic Number Identification (ANI) is a basic element of telephone calls transported throughout the public and private telephone networks. For the North America Numbering Plan (NANP), it is currently 10 digits long. ANI is used extensively for: call routing, call billing, call tracking, and call identification.

The North American Numbering Plan (NANP) has 680 area codes available for use. Of these, currently over 40 area codes are used for other countries that participate in the NANP.

Call Routing Based on ANI

Area Code Routing based on the calling phone number is a common feature found in most long distance telephone networks. Based on the calling party number (ANI) the call can be routed and/or receive special treatment by telephone switches, the phone network, and equipment. Some Interexchange Carriers (IXC's) (such as AT&T, MCI, Sprint, etc.) and Local Exchange Companies (LEC's) (such as Ameritech) provide many enhanced forms of call routing usually based on the first 3 or more ANI digit screening.

Call routing based on the first 3 ANI digits is usually referred to as Area Code Routing. For example, if the calling number ANI was 614/847-6161, then Area Code Routing would consider the "614" part of the ANI and route the Ohio originated call using the "614" as the broad geographic data element to start the routing routines and calculations, based on the routing rules and other factors (e.g., agents available, volume of calls, lines available, time of day, day of week, percent allocation, and other factors).

Call Routing based on more than the first 3 ANI digits allows for more geographic precision. Most ANI's have a geographic relationship. Bell Core publishes a LERG (Local Exchange Routing Guide) that gives the approximate longitude and latitude for the area code/exchange (as well as other data contained in the LERG) represented by the first 6 digits of the ANI. For example, for the calling number 614/847-6161 the "614-847" component has the geographic representation of Ohio and the metropolitan area of North Columbus/Worthington. The Area-Code-Exchange (NPA-NXX) Routing ability gives even greater routing definition for the calling party (ANI). If a caller to an 800 number with an ANI of "614/847-6161" was in need of being connected to a towing service, then the geographically closest towing service might be identified to handle the towing job (at a shorter travel time and possible lower cost).

Call Identification

One of the most wide spread and well-known uses of the caller's ANI is Caller ID (Caller Identification). The concept of Caller ID is to pass on to the recipient of the call the ANI of the caller before the call is answered. ANI has been a key component of ISDN (Integrated Services Digital Network) defined by the CCITT in the 1970's. The caller's ANI has traveled the phone network since the 1970's, if not earlier, in the form of two products:

1. 1-800 Access Type Service;
2. Integrated Services Digital Network (ISDN Service)

Many companies, business, and individuals use ISDN, digital access, and/or Call ID to get the data elements of the call-one of which is caller ANI.

The ANI of the caller is preserved and passed on as the call passes through the Public Telephone Network (and usually the Private Telephone Network, if possible). For example, the caller ANI may traverse through the LEC, IXC, CAP (Competitive Access Provider), PBX, ACD, Agent and so forth, so the final recipient receives the caller's ANI (i.e., caller ID).

PSTN (public switched telephone network) is the world's collection of interconnected voice-oriented public telephone networks, both commercial and government-owned. It's also referred to as the Plain Old Telephone Service (POTS). It's the aggregation of circuit-switching telephone networks that has evolved from its inception. Today, the PSTN is almost entirely digital in technology except for the final link from the Co to the user.

In relation to the Internet, the PSTN actually furnishes much of the Internet's long-distance infrastructure. Because Internet service providers (ISPs) pay the long-distance providers from access to their infrastructure and share the circuits among many users through packet-switching, internet users avoid having to pay usage tolls to anyone other than their ISPs.

Many conventional caller ID devices display the incoming phone number, but very few people are able to geographically recognize every area code. In this respect, reference is made to U.S. Pat. Nos. 6,009,149, 6,137,870, and 6,298,122, which disclosures are hereby incorporated by this reference. Moreover, most caller ID users would not inherently know more than a few of the local exchanges and their corresponding cities.

With an ever-increasing number of new area codes being used, those skilled in the art have recognized a significant need for an improved system for decoding and processing advanced determination and display of city and state caller information. The present invention fulfills these needs.

SUMMARY OF THE INVENTION

The present invention provides an improved decoding and processing system for advanced determination and display of geographic information of a call origination party. The unique system comprises a mobile switching center having means for receiving a CND message containing call identification data from a signal derived from a communication network; server means for storage and retrieval of specific data from a data base library for selectively determining the corresponding geographic information of the CND message received from the call origination party; means for wireless transmission of the corresponding geographic information for reception by a mobile handset; and a readout device for displaying the geographic information of the call origination party.

Accordingly, the improved system provides the user with convenient and efficient display of geographic caller identification that is capable of determining an ever-increasing number of area code and local telephone exchange numbers.

DESCRIPTION OF THE PREFERRED EMBODIMENTS

An improved decoding, processing and delivery system for a centralized wireless architecture is provided for advanced determination and display of geographic information to a called party relating to a call origination party. The improved system comprises a receiving device to receive the calling number delivery (CND) message from a mobile station switching center; a central data server for storage and retrieval of specific data from a library for selectively determining the corresponding geographic information of the call origination party; a transmission device for sending data from the server; a receiving device in a wireless handset; and a readout device for displaying the geographic information of the incoming call. Accordingly, the improved system provides the user with convenient and efficient display of geographic information related to caller identification that is capable of determining an ever-increasing number of area code and local telephone exchange number.

Calling Number Delivery (CND), better known as Caller ID, is a telephone service intended for residential and small business customers. It allows the called Customer Premises Equipment (CPE) to receive a calling party's directory number.

Figure 1:
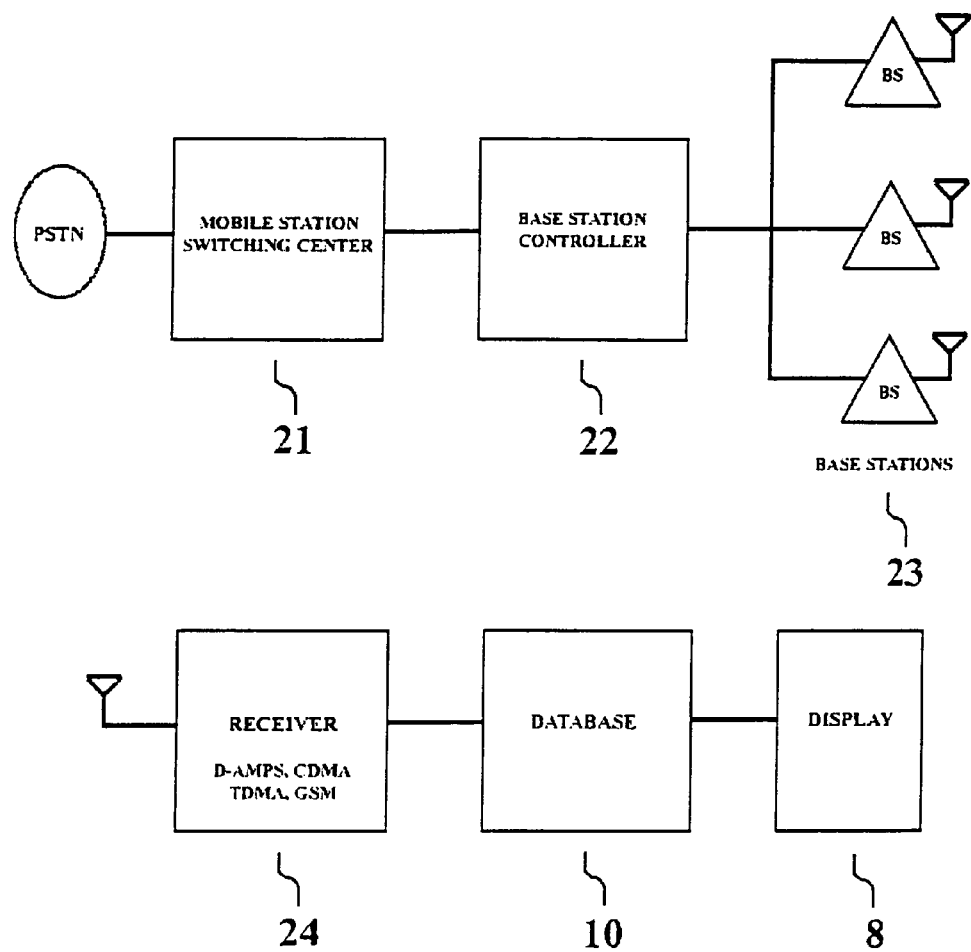
FIG. 1 is a schematic block diagram illustrating one embodied form of the inventive system for mobile cellular service.

Referring now to FIG. 1, there is depicted a schematic block diagram of the present invention including a receiver for mobile cellular service. In this respect, the calling number delivery (CDN) message is transmitted through a mobile station switching center 21 and thereafter transmitted to a base station controller 22. The message is thereafter transmitted to a plurality of base stations 23. A receiving device for mobile cellular service decodes the cellular data packet by a data base means 10, for instance a microcontroller. Corresponding geographic information by matching the area code and/or local exchange number received from the receiver 24 is determined, and the output signal from the database is transmitted to a display device 8 for displaying the geographic information of the incoming call.

If the city and state information is not current, incoming call information may not match any of the entries in the memory. In the case of known area code but missing exchange, the state name will still be displayed.

D-AMPS (Digital-Advanced Mobile Phone Service)

D-AMPS, sometimes spelled DAMPS, is a digital version of AMPS (Advanced Mobile Phone Service), the original analog standard for cellular telephone phone service in the United States. Both D-AMPS and AMPS are now used in many countries. D-AMPS adds time division multiple access (TDMA) to AMPS to get three channels for each AMPS channel, tripling the number of calls that can be handled on a channel. D-AMPS is Interim Standard-136 from the Electronics Industries Association/Telecommmunication Industries Association (EIA/TIA).

Although AMPS and D-AMPS originated for the North American cellular telephone market, they are now used worldwide with over 74 million subscribers, according to Ericsson, one of the major cellular phone manufacturers. D-AMPS is one of three digital wireless technologies that use TDMA. The other two are GSM and PCD. Each of these technologies interprets TDMA differently so they are not compatible. An advantage of D-AMPS is that it is easier to upgrade to from an existing analog AMPS network. An alternative to D-AMPS and the other two TDMA technologies is direct sequence code division multiple access (CDMA).

CDMA is a spread-spectrum technology t hat allows multiple frequencies to be used simultaneously. CDMA codes every digital packet it sends with a unique key. A CDMA receiver responds only to that key and can pick out and demodulate the associated signal.

Time Division Multiple Access (TDMA)

Time division multiple access (TDMA) is a digital transmission technology that allows a number of users to access a single radio-frequency (RF) channel without interference by allocating unique time slots to each users within each channel. The TDMA digital transmission scheme multiplexes three signals over a single channel. The current TDMA standard for cellular divides a single channel into six times slots, with each signal using two slots, providing a 3 to 1 gain in capacity over advanced mobile-phone service (AMPS). Each caller is assigned a specific time slot for transmission.

GSM

GSM is a digital mobile telephone system that is widely used in Europe and other parts of the world. GSM uses a variation of time division multiple access (TDMA) and is the most widely used of the three digital wireless telephone technologies (TDMA, GSM, and CDMA). GSM digitizes and compresses data, then sends it down a channel with two other streams of user data, each in its own time slot. It operates at either the 900 MHz or 1800 MHz frequency band.

Figure 2:
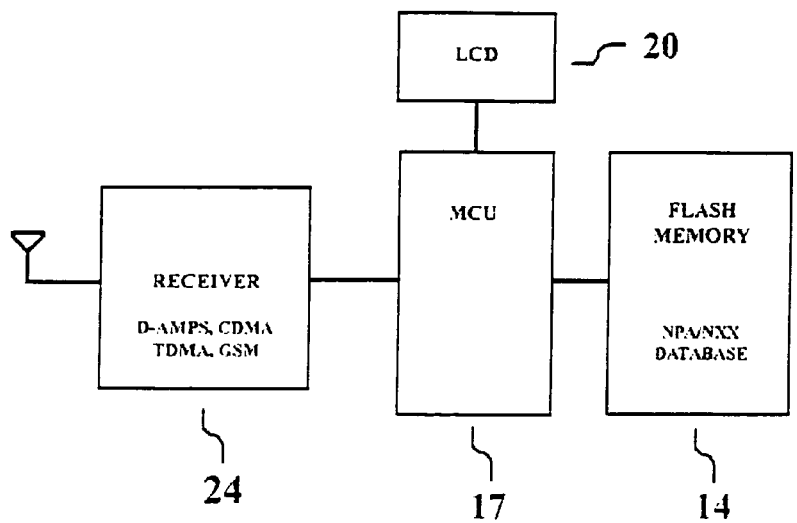
FIG. 2 is a schematic block diagram illustrating an embodiment having a flash memory storage means for a mobile cellular phone.

As shown in FIG. 2, the receiving device 24 may utilize D-AMPS, CDMA, TDMA or GSM transmitted signals for mobile cellular service. The CND is received and decoded from the cellular data packet by the host microcontroller 17. The microcontroller 17 then compares the first three digits of the NPA to the look-up table in the city and state database memory 14. Once the memory address for the corresponding area code is found a match can be made to the NXX to read the city data. The city and state data are then displayed on the LCD 20 with the other standard name and number caller ID information. Cellular phones with full graphic displays may alternately or additionally display the geographic location information pictorially.

Figure 3:
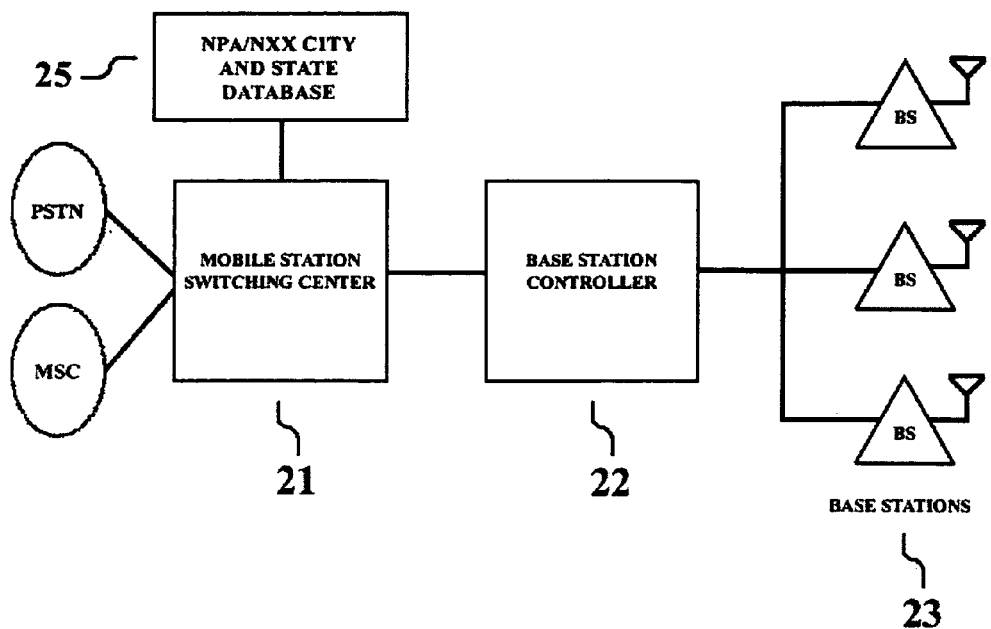
FIG. 3 is a schematic block diagram illustrating one embodied form of the present invention for advanced determination and display of geographic information relating to the call origination point database look-up, and transmission of the data.

FIG. 3 illustrates one embodiment of the present invention. The MSC 21 receives a CND from the PSTN or other MSC from inter-network communications. The NPA/NXX City and State database server 25 then compares the first three digits of the NPA to the look-up table in the city and state database. Once a match is found for the corresponding area code, a match can be made to the NXX to read the city data. The city and state data are then transmitted 23, along with the CND.

Figure 4:
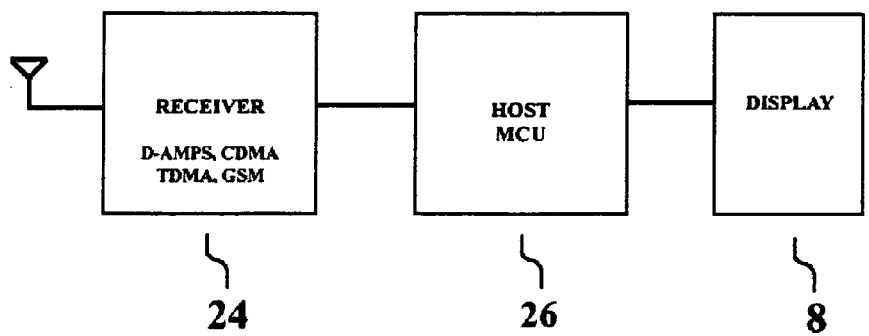
FIG. 4 is a schematic block diagram of a suitable receiver and display means in a mobile handset.

In FIG. 4, the data is received 24 and prepared by the host microcontroller 26 for display 8 on the mobile handset. Cellular phones with full graphic displays may alternately or additionally display the geographic location information pictorially.

Although the foregoing is illustrative of the NANP (North American Numbering Plan), those skilled in the art recognize that the inventive system may also be used with foreign numbering plans. In this respect, foreign countries have equivalent identifier information that may be correlated geographically in the particular country.

GSM is the de facto wireless telephone standard in Europe. GSM has over 120 million users worldwide and is available in 120 countries, according to the GSM MoU Association. Since many GSM network operators have roaming agreements with foreign operators, users can often continue to use their mobile phones when they travel to other countries.

It also known that in the NANP even greater information in the CND can exist beyond the 10-digit NPA/NXX, such as will 1,000 block number pooling. In order to conserve the limited amount of possible phone number combinations 1,000 block number pooling allows smaller units of phone number blocks to be issued to a carrier. The traditional method was to issue an entire exchange. However, this method was inefficient so now and in the future greater levels granularity may exist be analyzing even more digits of resolution in the phone number.

Although the foregoing is illustrative of the NANP (North American Numbering Plan) those skilled in the art recognize that the inventive system may also be used with foreign numbering plans. In this respect foreign countries have equivalent identifier information that may be correlated geographically in the particular country.

For example, Mexico has recently completed a series of numbering plan changes which were supposedly implemented in stages. The first stage was to expand the local numbers to a standard 7 digits. Three cities—Mexico City, Guadalajara and Monterrey—with high telephone density already had 8 digit local numbers and were not subject to this local numbering change. It was also recommended in the plan change that the term local number be changed to subscriber number (SN). It appears that the original local numbers, with some exceptions, were 5 digits in length. To make the change easier for consumers, the two extra digits were taken from the last digits of the existing area code and attached to the beginning of the local number. This made the area code only a single digit for an interim period.

Subsequent to the local number change, the national number was expanded from 8 to 10 digits. The national number is comprised of the country code (52), regional identification number (RIN) and the local number. The RIN is also referred to as the area code, but it has been recommended that it now be termed the national destination code (NDC).

Under this numbering plan change, which by all claims became effective in November 2001, each local service area was assigned a new regional identification number (i.e., 3-digit area code). Again, Mexico City, Guadalajara and Monterrey were the exceptions because of their existing 8-digit local numbers and were assigned two-digit area codes. Several sites have lists of the new RINs for at least the top 100 cities.

In recent years, Australia has also phased in number plan changes to achieve standardization and allow for expansion. Local numbers were standardized to 8 digits. Interestingly enough, the 54 area codes in place prior to the numbering plan changes have been reduced o a mere four area codes—02, 03, 08 and 07. Additionally, all mobile phone numbers, regardless of network, have an area code of 04. Here too, it looks like the old area codes were used to expand the local number by attaching them to the front of the existing local number.

The UK's National Numbering Scheme is a list of all their telephone numbers that are allocated, free, protected, reserved or not designated. The scheme provides the framework for the numbering plan and includes the United Kingdom's Specified Numbering Scheme (SNS) managed by Oftel. However, Oftel does not control all telephone numbers. There are Short Codes, for example, which are memorable 3- to 6-digit numbers not governed by Oftel, that provide access to telephony services for end users.

The National Significant Number (NSN) is part of the UK's numbering scheme. The NSN consists of the Geographic Area Code (formerly the National Destination Code) and the Subscriber Number. The UK is working to make 10-digit NSNs (not including the national code of '01') the standard. This would consist of 3-digit area codes followed by 7-digit subscriber numbers, or 4-digit codes followed by 6-digit numbers. In the meantime, area codes today can range from 3–6 digits and subscriber numbers from 3–7 digits.

The area codes in Japan can be 1 to 5 digits in length. The subscriber number (i.e., local exchange number+subscriber number) can then be 4 to 8 digits in length. The trunk prefix for Japan is also '0'. Japan's National Significant Number is represented a 'OABCDEFGHIJK', so the phone number length, like the UK, will not exceed 11 digits. Phone numbers cannot start with '1'. Mobile phone numbers have a separate prefix from fixed lines.

With all foreign numbering plans and even greater resolution in the NANP beyond the NPA/NXX, such as 1,000 block number pooling, those skilled in the art will recognize ability to correlate different types of CND's with a geographical location.

Accordingly, the improved system provides the user with convenient and efficient display of geographic information related to caller identification that is capable of determining an ever-increasing number of area code and local telephone exchange numbers.

I claim:

1. An improved decoding and processing system for advanced determination and display of geographic information of a call origination party, said system comprising:
   a) a mobile switching center having means for receiving a CND message from a call origination party, said message containing call identification data from a signal derived from communication network;
   b) server means for storage and retrieval of specific data from a data base library for selectively determining the corresponding geographic information of said CND message received from the call origination party;
   c) means for wireless transmission of said corresponding geographic information for reception by a mobile handset; and
   d) a readout device for displaying the geographic information of the call origination party.

2. The improved system of claim 1 wherein the corresponding geographic information is a city identification of the call origination party.

3. The improved system of claim 1 wherein the corresponding geographic information in a state identification of the call origination party.

4. The improved system of claim 1 wherein the corresponding geographic information in a country identification of the call origination party.

5. The improved system of claim 1 wherein the corresponding geographic information in a province identification of the call origination party.

6. The improved system of claim 1 wherein the corresponding geographic information is displayed pictorially.

7. The improved system of claim 1 wherein the communication network is PSTN.

8. The improved system of claim 1 wherein the communication network is an intra-network.

9. The improved system of claim 1 wherein the standard data field is a data field for a dialed number.

10. The improved system of claim 1 wherein the call data character stream replaces the contents of the standard data field.

11. The improved system of claim 1 wherein the call data character stream references information stored in a database.

12. The improved system of claim 1 wherein the call data character stream is used to process the voice path of the telephone call.

* * * * *